Oct. 23, 1962 J. H. VARTERASIAN 3,060,370
DISPLACEMENT TRANSDUCER
Filed Feb. 23, 1960
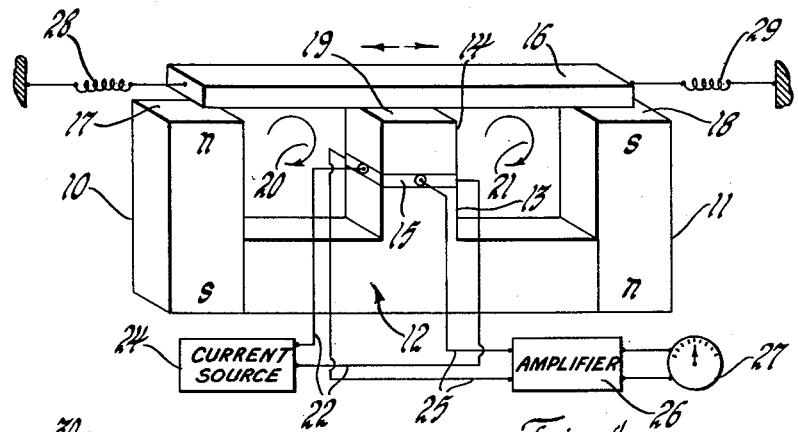
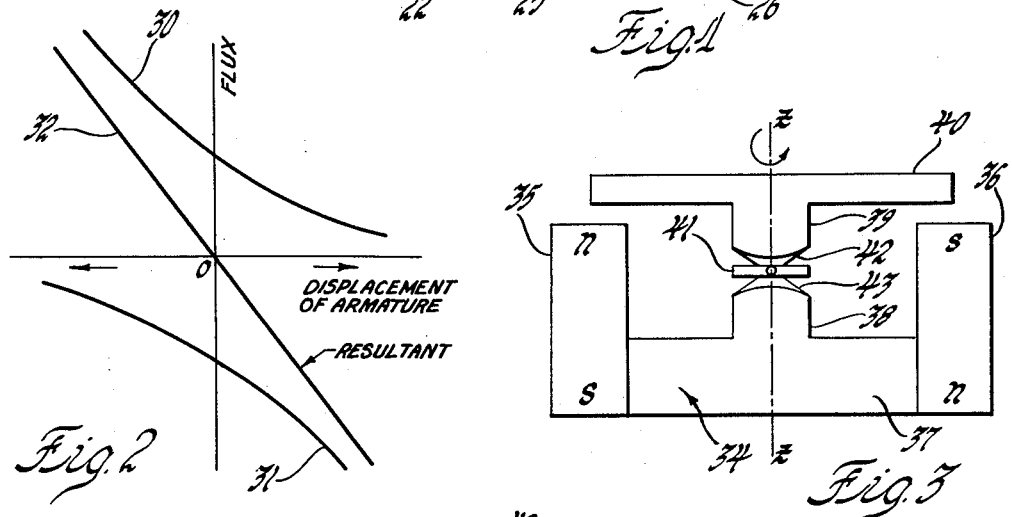
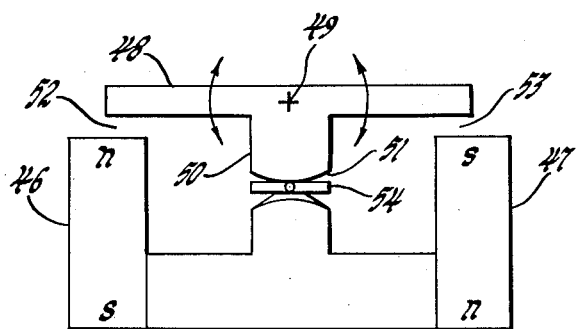
INVENTOR.
John H. Varterasian
BY
Paul J. Ethington
ATTORNEY

United States Patent Office 3,060,370
Patented Oct. 23, 1962

3,060,370
DISPLACEMENT TRANSDUCER
John H. Varterasian, Detroit, Mich., assignor to General Motors Corporation, Detroit, Mich., a corporation of Delaware
Filed Feb. 23, 1960, Ser. No. 10,424
9 Claims. (Cl. 323—94)

This invention relates to apparatus for producing an electrical signal that is a function of mechanical displacement, and more particularly to a displacement transducer which utilizes a Hall effect device as an active element.

The operation of the Hall effect device which is employed in this invention is based upon the characteristics of certain semiconductors which produce an electric potential along one axis of the material in response to an electric current and a magnetic field along normal axes of the semiconducting material. The magnitude of the potential produced will depend on the composition and dimensions of the Hall effect device and the potential will vary substantially linearly with variations in magnetic field intensity and in current. It is proposed to utilize such a Hall effect device in a displacement transducer to provide a voltage output that is linearly related to the mechanical displacement.

It is the principal object of this invention to provide apparatus for producing an electric signal that varies linearly with mechanical displacement. It is a further object of this invention to provide a displacement transducer utilizing a Hall effect device such that the voltage output thereof varies linearly with displacement.

In accordance with this invention a permanent magnet or other source of magnetic flux is provided with a flux path in the form of a core of magnetic material. Flux responsive means, such as a Hall effect device, are included in the flux path. The Hall effect device would be excited by a constant reference current so that the output voltage of the device would be a function of the magnetic flux in the flux path. The flux path also includes an air gap or other variable reluctance means and this air gap is made variable in response to the displacement which it is desired to investigate. In the preferred embodiment of this invention, two flux paths are provided by using an E-shaped core and including a source of flux in each of the outside legs. A Hall effect device is positioned in the center leg of the core through which the two sources tend to produce opposing flux. A movable armature is disposed across the legs of the E-shaped core and is of such a configuration that a linear relationship exists between the change of flux in the center leg and the displacement of this armature. This results in voltage output from the flux responsive means or the Hall effect device that is a linear function of displacement.

The novel features that are considered characteristic of this invention are set forth in the appended claims. The invention itself, however, both as to its organization and method of operation, along with further objects and advantages thereof, may best be understood by the following description when read in conjunction with the accompanying drawings, in which:

FIGURE 1 is a diagram of displacement measuring apparatus incorporationg the invention;

FIGURE 2 is a graphic representation of the electrical output characteristics of the apparatus of FIGURE 1;

FIGURE 3 is a diagram of a modification of the apparatus of FIGURE 1; and

FIGURE 4 is a diagram of a further modification of the apparatus of FIGURE 1.

Referring now to the drawing, and more particularly to FIGURE 1, a magnetic structure of the E-shaped core configuration is shown having sources of magnetomotive force in the form of a pair of permanent magnets 10 and 11 in the two outside legs of the core. The core structure includes a body member 12 and a center leg having lower and upper portions 13 and 14. Located between the portions 13, 14 in the center leg is a Hall effect device 15. This device 15 preferably is a semiconductor crystal which generates a voltage across opposite terminals thereof that is a product of current flowing between the remaining terminals and the magnetic field in a direction perpendicular to the current. A movable armature 16 is positioned across the E-shaped core to define a series of air gaps 17, 18, and 19 between the armature and the three legs of the core. The center leg, the armature 16, and the member 12 define a path 20 for magnetic flux produced by the permanent magnet 10. This flux will tend to flow in a downward direction through the center leg. The center leg, the armature 16, and the member 12 further define a path 21 for the flux produced by the magnet 11, and this flux will tend to flow in the opposite direction or upward through the center leg.

Connected to opposing edges of the device 15 are a pair of conductors 22 which in turn are connected across a reference current source 24. This source 24 may provide constant direct current or may be an alternating current source, depending upon the character of output that it is desired to obtain from the Hall effect device. Connected to the remaining edges of the device 15 are a pair of conductors 25, across which appears the output voltage. The conductors 25 are connected to the input of an amplifier 26, if necessary, and the output of this amplifier is applied to the desired electrical load 27 which may take the form of an indicator or control device.

The armature 16 is resiliently mounted with respect to the E-shaped core by any convenient means as, for example, a pair of springs 28, 29 such that it may be laterally displaced with respect to the core in the directions indicated in FIGURE 1 by the arrows. Movement of the armature 16 will result in a change in the reluctance of the air gaps 17 and 18, but the reluctance of the air gap 19 will remain constant so long as the armature is not displaced in a vertical or transverse direction.

FIGURE 2 illustrates the transfer characteristics of the apparatus of FIGURE 1, and is a plot of magnetic flux as a function of the lateral displacement of the armature 16. A graph 30 represents the magnetic flux in the loop 20 as the armature 16 is displaced in a lateral direction and this flux will always be positive or flow in a downward direction in the center leg through the device 15. This will be a non-linear function since it is related to the reluctance of the air gap 17. Likewise, a graph 31 represents the flux in the leg 21. This is shown to be negative since the magnetic flux will flow in an upward direction in the center leg. If the magnetic structure is symmetrical, the resulting flux through the center leg or through the device 15 will be linear since it is the algebraic sum of that flowing in the loops 20 and 21, as is illustrated by a line 32.

In the operation of the apparatus shown in FIGURE 1, the armature 16 may be displaced by mechanically coupling the armature to a vibrating workpiece. If the source 24 provides a constant direct current through the device 15 then there will appear across the conductors 25 a voltage having an instantaneous magnitude and polarity that is dependent upon the position of the armature 16, or in other words, dependent upon the relative reluctances of the air gaps 17 and 18. So long as the armature is not displaced, the output voltage is zero if a symmetrical relationship exists. If the armature 16 is held in a displaced or unsymmetrical position, the voltage appearing across the conductors 25 is a direct voltage of a constant magnitude and polarity.

If the source 24 provides alternating current input to the Hall effect device 15, the output voltage appearing across conductors 25 is an alternating voltage of a constant magnitude and phase relationship if the armature 16 is maintained in a displaced position. If the armature 16 is vibrated while there is an A.C. input, an A.C. output results which varies in magnitude and reverses in phase.

In FIGURE 3 there is shown a modification of the invention wherein an E-shaped core 34 utilizes permanent magnets 35 and 36 as above. A body member 37 and a lower portion 38 of the center leg are included in this modification and are comprised of magnetic material. A cylindrical upper portion 39 of the center leg is shown to be fixedly or integrally connected to a movable armature 40. The armature 40 is of a flat semi-circular configuration here, the straight edge of the semi-circle being parallel to the long dimension of the core 34. This armature 40 is maintained such that it is free to rotate about the axis Z—Z of the cylindrical portion 39 which coincides with the axis of the semi-circular armature 40. Positioned between the upper and lower portions of the center leg is a Hall effect device 41 of the same type that is described above. The upper and lower portions 39 and 38 of the center leg may be relieved to form conical sections 42 and 43 in order to concentrate the magnetic field upon the more active portion of the Hall effect device 41.

In the operation of the apparatus of FIGURE 3 it should be noted that the air gaps between the armature 40 and the permanent magnets 35 and 36 will vary in reluctance as the armature is rotated about the axis Z—Z which is coincident with the center line of the center leg portions 38 and 39. The reluctance of the center leg will not vary, however, so long as a symmetrical relationship exists. The output characteristics of this apparatus will be the same as that shown in FIGURE 2, except that arcuate displacement is involved rather than lateral displacement.

With reference to FIGURE 4, a further modification of the invention is illustrated wherein an E-shaped core 45 includes a pair of permanent magnets 46 and 47 positioned in an opposing relationship. A movable armature 48 is positioned across the E-shaped core and is adapted to rotate about the transverse axis 49 which is perpendicular to the center line of the center leg of the core. An upper portion 50 of the center leg of the core includes a cylindrical surface 51 which has a center of curvature coincident with the axis 49. Thus, when the armature 48 departs from a symmetrical position, then a pair of air gaps 52 and 53 will produce a variable reluctance in their respective flux paths. A Hall effect device 54 is positioned in the center leg and will produce an output voltage that is a linear function of the displacement of the armature 48 about the axis 49, providing an output characteristic similar to that of the apparatus of FIGURE 1.

While there has been illustrated several particular embodiments of the invention, it will be understood that the invention is not limited thereto since various modifications will be made by persons skilled in the art. It is contemplated that the appended claims will cover any such modifications as fall within the true scope of the invention.

I claim:

1. A displacement transducer for developing an electrical output having a polarity and magnitude corresponding to the direction and extent of a mechanical displacement, said transducer comprising first and second magnetic flux paths having a common portion, first and second sources of magnetic flux positioned in said first and second flux paths respectively and tending to produce flux in an opposing relationship in said common portion, a movable armature located in said paths and effective to create first and second air gaps in said first and second flux paths respectively, said movable armature being adapted to vary the first and second air gaps in an opposite sense whereby the net flux in said common portion varies in accordance with the sense and extent of displacement of the armature, and flux responsive means located in said common portion and adapted to produce an electrical output having a polarity and magnitude corresponding to the polarity and amount of said net flux.

2. Apparatus for producing an electrical output in accordance with a mechanical displacement comprising first and second magnetic flux paths having a common portion, first and second sources of magnetic flux positioned in said first and second flux paths respectively and tending to produce flux in an opposing relationship in said common portion, movable means located in said flux paths and effective to create first and second air gaps in said first and second flux paths respectively, said movable means adapted to vary the relative reluctances of said first and second air gaps in response to mechanical displacement, a Hall effect device located in said common portion, and signal utilization means connected to said Hall effect device.

3. Apparatus for producing an electrical output in accordance with a mechanical displacement comprising an E-shaped magnetic core, a first permanent magnet positioned in one of the legs of said core, a second permanent magnet positioned in another of the legs of said core, said permanent magnets being oriented to tend to produce magnetic flux in an opposing relationship in the remaining leg of said core, a movable armature of permeable material positioned across the open end of said core, and flux responsive means located in the flux path of said remaining leg and being adapted to produce an electrical output in accordance with mechanical displacement of said armature.

4. A displacement transducer comprising an E-shaped magnetic core, a first permanent magnet positioned in one of the legs of said core, a second permanent magnet positioned in another of the legs of said core, said permanent magnets being oriented to tend to produce magnetic flux in an opposing relationship in the remaining leg of said core, a movable armature of permeable material positioned across the open end of said core, a Hall effect device located in the flux path of said remaining leg and having input and output terminals, a constant current source connected across said input terminals, and voltage responsive means connected across said output terminals.

5. Apparatus for producing an electrical output in accordance with a mechanical displacement comprising a magnetic core having first, second, and third legs, a movable armature positioned across said core, a first source of magnetic flux located in said first leg and adapted to tend to produce flux in said second leg in one direction, a second source of magnetic flux located in said third leg and adapted to tend to produce flux in said second leg in the opposite direction, said armature and said core being symmetrically oriented such that no flux results in said center leg when said armature is in its undisplaced position and such that a linear relationship exists between the displacement of said armature and the flux in said center leg, and flux responsive means located in the flux path of said center leg and adapted to produce an electrical output that is related in magnitude and polarity to the magnitude and direction of flux in said center leg.

6. A displacement transducer comprising a magnetic core having first, second, and third legs, a movable armature positioned across said core, a first source of magnetic flux located in said first leg and adapted to tend to produce flux in said second leg in one direction, a second source of magnetic flux located in said third leg and adapted to tend to produce flux in said second leg in the opposite direction, said armature and said core being symmetrically oriented such that no flux results in said center leg when said armature is in its undisplaced position and such that a linear relationship exists between the displacement of said armature and the flux in said center leg, and a Hall effect device located in the flux path of said center leg and adapted to produce a voltage output that is related in magnitude and polarity to the magnitude and direction of flux in said center leg.

7. Apparatus according to claim 6 wherein said armature is laterally movable with respect to said core.

8. Apparatus according to claim 6 wherein said armature is free to rotate about an axis coincident with the axis of symmetry of said second leg.

9. Apparatus according to claim 6 wherein said armature is free to rotate about an axis perpendicular to the axis of symmetry of said second leg.

References Cited in the file of this patent

UNITED STATES PATENTS 1,863,936     Schwager _____ June 21, 1932

OTHER REFERENCES

"Hall Effect Generators," Electronic Design, March 4, 1959, pp. 28–31.